April 3, 1934.  R. GOOD  1,953,221
METHOD AND APPARATUS FOR FEEDING BATCH MIXTURES TO FURNACES
Filed June 12, 1930   2 Sheets-Sheet 1

Inventor
Robert Good
By Eccleston + Eccleston
Attorneys

April 3, 1934.   R. GOOD   1,953,221
METHOD AND APPARATUS FOR FEEDING BATCH MIXTURES TO FURNACES
Filed June 12, 1930   2 Sheets-Sheet 2

Inventor
Robert Good
By Eccleston & Eccleston
Attorneys

Patented Apr. 3, 1934

1,953,221

UNITED STATES PATENT OFFICE 1,953,221

METHOD AND APPARATUS FOR FEEDING BATCH MIXTURES TO FURNACES

Robert Good, Washington, Pa., assignor to Hazel-Atlas Glass Co., Wheeling, W. Va., a corporation of West Virginia Application June 12, 1930, Serial No. 460,777

27 Claims. (Cl. 49—54)

The invention disclosed herein is an improvement upon and a continuation in part of my application Ser. No. 269,447, filed April 12, 1928. The earlier application discloses a device in which the batch is evenly distributed on the surface of the glass, and then caused to float forwardly within the furnace, always in the same straight path. In practical use, the device disclosed in said earlier application has not only effected a very material saving in labor, but also has produced a more effective melting of the batch mixture with a consequent more uniform quality of refined glass. This, in turn, resulting in an increased production of finished articles.

The object of the present improvement, is to retain all the advantages of the apparatus and method disclosed in the earlier application, and at the same time further improve the quality of the refined glass and the production of finished articles; by floating the batch into the furnace over a fan-shaped area, as distinguished from the straight-line method.

Further objects and advantages of the invention will be apparent to those skilled in the art, from the following description, when taken in connection with the accompanying drawings, in which.

Figures 1, 2, 3, 4:
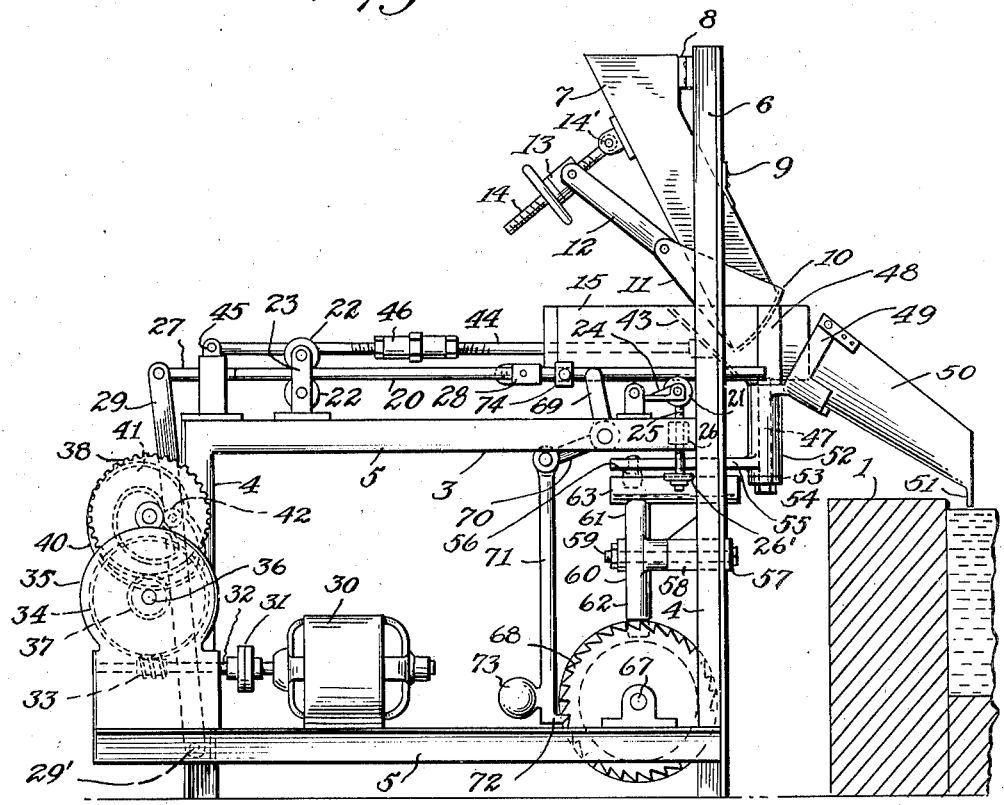
Figure 1 is a side elevational view of the apparatus.
Figures 2 and 3 are detail views of a dog house showing steps in the feeding of a charge.
Figure 4 is a diagrammatic view, illustrating various positions assumed by the chute.
Figures 5, 6:
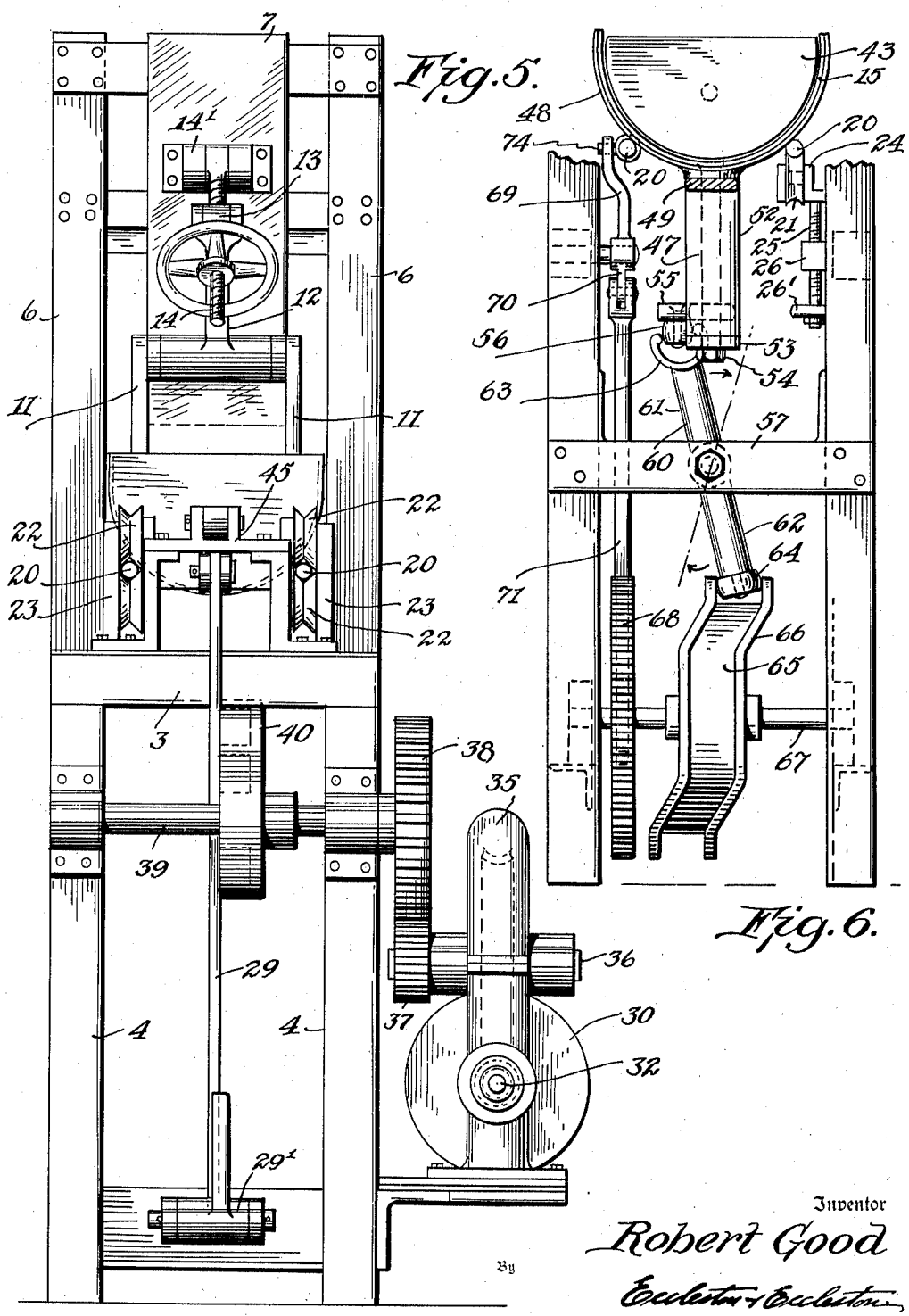
Figure 5 is a rear elevational view of the apparatus.
Figure 6 is a front view, on a larger scale than Figure 1, of the mechanism for shifting the chute to various positions; the chute being omitted.

As the present invention is, in the preferred form disclosed herein, combined with the apparatus disclosed in my earlier application Ser. No. 269,447, it is desirable to first describe the apparatus of the earlier application, and then describe the present improvement in the apparatus and method; it being noted, however, that the present invention is in no manner limited to use with the apparatus disclosed in the earlier application.

Numeral 1 designates a portion of the rear end of a glass furnace of the continuous type and generally referred to as a dog house. Such structures usually include an arched aperture through which the charge is admitted to the interior of the melting tank; such aperture being here indicated by the numeral 2.

The framework of the batch feeder is designated generally by the numeral 3, and is preferably composed of the vertically disposed legs 4 of angle iron or the like, and the horizontal brace bars 5. The legs or uprights 4 adjacent the dog house, are provided with vertical extensions 6 which form a support for a hopper 7. This hopper is suitably secured to the vertical extensions as indicated by numerals 8 and 9, and receives the batch through its upper end, from a batch bin (not shown), or from any other source. The lower end of the hopper 7 is provided with a closure or gate 10 pivoted by means of its arms 11 to the rear wall of the hopper or other fixed support on the frame. Operatively associated with the pivot of the gate 10 is an arm 12 which has its opposite end pivotally connected with a swivel nut 13 mounted on the screw 14. This screw is pivotally connected at 14' to the rear wall of the hopper 7, thereby allowing a swinging movement of the screw as the nut 13 is adjusted lengthwise thereof. It will be apparent that by means of this construction the gate 10 may be readily moved to closed position, or adjusted to various open positions, thus regulating the quantity of material passing through the hopper per unit of time.

Reciprocably mounted on the frame 3, so as to slide back and forth below the hopper 7, is a trough 15. In the apparatus disclosed in my earlier application a downwardly inclined chute was fixed to the front end of the trough. It extended directly forward from the trough, and was immovable laterally with respect to the trough. As will appear hereinafter, the inclined chute of the present invention is automatically shifted laterally with respect to the trough.

The trough 15 is mounted on the forward portions of two parallel rods 20, and is preferably connected thereto by spot welding or the like. These rods are supported and guided at their front and rear ends by means of rollers or sheave wheels 21 and 22 respectively. The wheels 22 are mounted in bearings 23, and it will be noted that two of these wheels are provided for each rod 20, one above and one below the same, to restrict the movements of the rods to a substantially horizontal plane. The forward rollers or wheels 21 are mounted on pivoted or hinged bearings 24, which may be raised or lowered by means of screws 25. These screws are threaded through nuts 26 fixed to the frame, and have their upper ends in engagement with the bearing members 24. Obviously, these bearing members could be rigidly connected, if desired, and thus be raised or lowered by the operation of a single screw 25. A hand wheel 26' is provided for facilitating the adjustment of the bearing, and it will be apparent that through their adjustment the trough and the chute associated therewith, may be raised or lowered to the desired level.

As before mentioned, the trough 15, when in operation, is reciprocated back and forth below the bottom of the hopper 7, and for this purpose a connecting rod 27 is pivotally connected at its forward end to a crosshead 28 carried by the rods 20. The rear end of the connecting rod is pivotally attached to the upper end of a lever 29, which has its lower end pivotally mounted on the frame 3, as indicated by numeral 29'.

For imparting an oscillating motion to the lever 29, and thereby reciprocating the trough 15, there is provided a conventional type of variable speed motor 30, which is mounted on the base of the frame 3. The rotor shaft of the motor is coupled, as indicated by numeral 31, with a worm shaft 32 which carries a worm 33. This worm meshes with a worm wheel 34 in gear case 35; and the shaft 36 of this worm wheel also carries a pinion 37 meshing with gear wheel 38 fixed to a shaft 39. Also keyed on shaft 39 is a positive cam 40, provided with a closed track 41 in which rides a roller 42 mounted on the lever 29. By this train of gearing the motor shaft will impart a reciprocating movement to the trough 15; and this movement will preferably be a slow forward stroke and a quick return stroke, the cam being designed to give the proper strokes. It will be understood, of course, that the speed of operation of the chute may be varied by the resistances employed in the motor of the type indicated.

For the purpose of projecting the batch mixture from the trough 15, into the chute to be described hereinafter, there is provided what may be termed a shovel. This element, which is designated by the numeral 43, is preferably of a shape conforming to the interior of the trough 15, and is mounted on the forward end of a rod 44. The opposite end of the rod 44 is hinged to a bearing plate 45 mounted on the frame 3, and the rod is preferably provided with a turnbuckle 46 by means of which the effective length of the rod may be varied with a consequent adjustment of the position of the shovel 43. As will be obvious from the drawings, the principal function of the shovel is to cause the batch mixture in the trough 15 to be discharged into the chute (to be described), when the trough and chute are drawn rearwardly by means of the lever 29.

The operation of the device disclosed in my said earlier application, and the method by which the batch mixture is fed into the furnace, will be described very briefly, in order to distinguish it from the present apparatus and method, to be described hereinafter.

As the trough 15 moves forward into the tank 1 a layer of the batch mixture is deposited upon the bottom of the trough; and as the trough is drawn rearwardly the shovel or scraper 43 will force the layer of batch mixture onto and down an inclined chute which is fixed to the forward end of the trough. As the trough again moves forward the above operation will be repeated, and at the same time a pusher element carried by the chute, will travel along the surface of the molten glass and cause the layer of batch mixture, which was spread on the surface of the glass in the previous cycle of operation, to float bodily into the furnace.

It will be understood, that in the apparatus disclosed in my earlier application, the chute was immovable laterally with respect to the trough, and hence the batch mixture was caused to float forward in the furnace always in the same straight-line path. As mentioned hereinbefore, in the present apparatus and method, the batch mixture is caused to spread over a fan-shaped area; and this method, together with the preferred embodiment of the apparatus for carrying out the method, will now be described.

Numeral 47 refers to a pivot pin which projects downwardly from the bottom of the trough 15; being attached to the trough in any desired manner, as by means of a band 48. A bracket 49 provides a mounting for a chute 50 which is inclined downwardly, and which is provided at its lower end with a pusher bar 51. The relation of the lower edge of the pusher bar to the surface of the glass in the tank, may be adjusted by the handwheels 26' as heretofore described.

The bracket 49, carrying the chute, has a hub 52 which is pivotally mounted on the pin 47; the hub being supported by a disc 53 and nut 54. Fixed to or formed integral with the hub 52 is an arm or lever 55 which extends rearwardly from the hub, and has its free end provided with a roller 56.

Secured to a crossbar 57 of the frame 3, or otherwise suitably mounted, is a bracket 58 carrying a pin 59, which functions as the fulcrum of a lever 60, having an upwardly extending arm 61 and a downwardly extending arm 62. The arm 61 carries at its upper end a guide 63 which extends fore and aft, and which is substantially U-shaped in cross-section. This guide receives the roller 56 of the arm 55; and obviously the length of the guide is such that it will continue to engage the roller throughout the full extent of the reciprocation of the trough 15 and chute 50.

The lower end of arm 62, of lever 60, is provided with a roller 64 which rides in a cam groove 65 of a cam 66. The contour of the cam groove is such, that as the cam rotates it will move the lever 60 step-by-step first to one side and then to the other side. Of course, the number of steps to the right and left of the central position may be varied in different installations, by employing different cam contours. The movement imparted to the lever causes the arm 55 to turn through a certain angle, thereby turning the chute 50 through the same angle. The apparatus for giving a step-by-step rotary movement to the cam 66, will now be described.

The cam is keyed or otherwise secured to a shaft 67, mounted on the frame of the machine; and also fixed to this shaft is a ratchet wheel 68. A bell crank lever, having an upwardly extending arm 69 and a downwardly extending arm 70, is mounted on the frame of the machine adjacent one of the rods 20. A ratchet bar 71 is pivotally mounted on the lower arm 70 of the bell crank lever, and the lower end of this bar is provided with a pawl 72 engaging the teeth of ratchet wheel 68. To assist in maintaining the bar in a vertical position and also to assist in lowering the bar, it is preferably provided with a weight 73. The pawl 72 engages the teeth of the ratchet wheel, as illustrated in Figure 1, and when the ratchet bar is elevated the ratchet wheel and the cam will be rotated through a certain predetermined angle. Of course, the pawl will ride freely over the teeth of the ratchet wheel when the ratchet bar is lowered.

The ratchet bar is periodically lifted, and then permitted to fall by gravity, by means of a tripper lug or finger 74, which is adjustably mounted on the rod 20 adjacent the lever arm 69, by means of a set screw. The arrangement is such that as the chute, trough and rod 20 travel forward the tripper lug will engage the bell crank lever arm 69 and move it forward, thereby causing the ratchet bar to be lifted to rotate the ratchet wheel and thus shift the position of the chute laterally. The extent of movement imparted to the ratchet wheel, may be varied by adjusting the tripper lug 74. The position of the tripper lug determines the point in the forward stroke at which the chute starts its laterally swinging movement. This swinging movement is preferably, though not necessarily, imparted to the chute just as the chute is approaching the end of its forward movement.

A brief description of the complete apparatus and method will now be given; it being noted, however, that the present invention is in no way limited to the particular apparatus disclosed for effecting the spreading of the batch mixture over a fan-shaped area; nor is the present invention in any manner limited to use with any particular mechanism for feeding the batch to the chute, though I preferably employ for such purpose the mechanism disclosed herein, which is the same as that disclosed in my said earlier application.

The motor 30, or other motive power, rotates the cam 40 continuously, thereby reciprocating the trough 15, preferably with a slow forward stroke and a rapid return stroke, the cam track 41 being designed for that purpose. Let it be assumed that the trough and chute have completed the forward stroke and are now on the return stroke. As the trough and chute move rearwardly the layer of batch mixture on the bottom of the trough will be pushed into the chute by the shovel 43. The mixture will flow down the chute and will be spread in a thin uniform layer on the surface of the molten glass in the rear of the tank.

The trough and chute now travel forward. The batch mixture will flow into the trough during its relatively slow forward movement; the volume of flow being regulated by the gate 10. Also, on this forward stroke, the pusher bar 51 will travel along the surface of the molten glass and push forward into the furnace the layer of batch mixture which was spread during the previous rearward movement. This movement of the thin layer of batch into the interior of the tank, is similar to the movement of a thin floating sheet of ice. This is, it floats or drifts bodily over the molten glass, without being forced into a pile or forced down into the glass, or without any disturbance whatever, other than the gentle floating or drifting, bodily movement.

As the trough and chute approach the end of their forward travel, the tripper finger 74 strikes and carries forward the upwardly extending arm 69 of the bell crank lever. This movement of the bell crank lever, through the mechanism described, causes the chute to swing to one side, say to the right, about the pivot pin 47. The chute retains this new position, and as the chute and trough travel rearwardly another thin layer of batch mixture will be spread upon the surface of the glass, just as described in the previous rearward movement, except this time the mixture will be spread over an area to the right of the first area covered. In the next cycle of operation, the chute may be moved one more step to the right, and then start the same step-by-step lateral movement to the left, and so on; the chute being continually swung step-by-step over the fan-shaped area. Of course, the number of steps will depend on the design of the cam. In the particular form illustrated herein the chute operates in its central position, and one step to the right and left. Figure 4 illustrates diagrammatically three positions of the chute.

Also, in the specific form illustrated herein, the chute moves laterally one step for each complete cycle of operation. Obviously the tripper finger 69 could be so adjusted, and the cam so designed, that a plurality of cycles of operation would occur for each position of the chute. That is, the chute would reciprocate two or more times over the same area, prior to being shifted. Also, in the specific form illustrated, the chute is turned about a pivot, step-by-step. Obviously mechanism could be employed for moving the chute bodily laterally step-by-step, instead of giving it a swinging movement, and of course, the bodily lateral movement or the swinging lateral movement could be a continuous to and fro movement instead of a step-by-step movement. And, while I have shown the trough as reciprocable, and the chute pivotally mounted on the trough, it is apparent that the trough and chute could be formed as a unitary element, and such element be given a reciprocating and oscillating movement as a unit. These few modifications are mentioned merely as illustrative of the many modifications which will be at once apparent, to those skilled in the art, from the disclosure of the invention.

The apparatus and method disclosed herein not only spread the batch in a thin layer and then cause it to float bodily forward into the furnace, and thereby improve the quality and increase the quantity of the refined glass and the finished articles, in accordance with the invention disclosed in my said application Ser. No. 269,447; but also further improve the quality and increase the quantity of the refined glass and the finished articles, by spreading the batch in the same manner, but over a larger area, in fan-shape fashion, so that the batch is more quickly melted and more quickly and more thoroughly assimilated with the body of the molten glass.

What I claim is:

1. A batch feeder for glass furnaces, including means for sequentially spreading side by side a series of layers of the batch on the surface of the glass, and means for causing the batch to float bodily forward in the furnace.

2. A batch feeder for glass furnaces, including means for sequentially spreading side by side a series of layers of the batch on the surface of the glass, and means for sequentially causing each layer of the batch to float bodily forward in the furnace.

3. A batch feeder for glass furnaces, including means for spreading the glass batch over a fan-shaped area, and means for pushing the batch forward in the furnace.

4. A batch feeder for glass furnaces, including means for spreading a series of radially arranged rows of glass batch, and means for moving the batch forward in the furnace.

5. A batch feeder for glass furnaces, including means for spreading a series of radially arranged rows of glass batch, and means for individually floating each row forwardly in the furnace.

6. The combination of a glass furnace having a melting end, and means for spreading glass batch on the molten glass in a series of radially arranged rows.

7. A batch feeder for glass furnaces, including a reciprocable chute for laying the glass batch on the molten glass, and means for periodically moving the chute laterally.

8. A batch feeder for glass furnaces, including a reciprocable chute for laying the glass batch on the molten glass, and means for periodically rotating the chute through a predetermined angle.

9. A batch feeder for glass furnaces, including a reciprocable chute for laying the glass batch, and means for moving the chute laterally step-by-step.

10. A batch feeder for glass furnaces, including a reciprocable chute for laying the glass batch, and means for moving the chute laterally one step for each reciprocation.

11. A batch feeder for glass furnaces, including a chute, means for periodically reciprocating the chute and means for periodically moving the chute laterally.

12. A batch feeder for glass furnaces including a chute for spreading the batch on the molten glass, and means for periodically moving the chute laterally.

13. A batch feeder for glass furnaces including a chute for spreading the batch on the molten glass, and means for periodically rotating the chute through a predetermined angle.

14. A batch feeder for glass furnaces, including a trough for receiving the batch, means to reciprocate the trough to deliver the batch to the surface of the molten glass, and means to periodically shift the path of delivery of the batch.

15. A batch feeder for glass furnaces, including a trough for receiving the batch, means for reciprocating the trough, a downwardly inclined chute pivotally mounted on the trough, and means for oscillating the chute across the surface of the molten glass.

16. A batch feeder for glass furnaces, including a trough for receiving the batch, means for reciprocating the trough, a chute mounted on the trough, and means operated by the reciprocation of the trough to move the chute laterally step-by-step.

17. A batch feeder for glass furnaces, including a trough for receiving the batch, means for reciprocating the trough, a chute mounted on the trough, means operated by the reciprocation of the trough to move the chute laterally step-by-step, and means for varying the extent of the step-by-step lateral movement.

18. A batch feeder for glass furnaces, including a trough, means for reciprocating the trough, a chute pivotally associated with the trough, a pawl and ratchet mechanism for swinging the trough laterally step-by-step, and a tripper associated with the reciprocable trough for operating the pawl and rachet mechanism.

19. A batch feeder for glass furnaces, including a trough, means for reciprocating the trough, a chute pivotally associated with the trough, a pawl and ratchet mechanism for swinging the trough laterally step-by-step, a tripper associated with the reciprocable trough for operating the pawl and ratchet mechanism, said tripper being adjustable longitudinally of the trough.

20. A batch feeder for glass furnaces, including a trough, means for reciprocating the trough, a chute pivotally associated with the trough, a cam for swinging the trough laterally, and means for operating the cam.

21. A batch feeder for glass furnaces, including a trough, means for reciprocating the trough, a pin carried by the trough, a hub pivotally mounted on the pin, a chute carried by the pin, an arm extending from said hub, a guide operatively associated with said arm, a lever, one arm of said lever carrying the guide, a cam, the lower arm of the lever associated with said cam, and means for operating the cam.

22. A batch feeder for glass furnaces, including a trough, means for reciprocating the trough, a pin carried by the trough, a hub pivotally mounted on the pin, a chute carried by the pin, an arm extending from said hub, a guide operatively associated with said arm, a lever, one arm of said lever carrying the guide, a cam, the lower arm of the lever associated with said cam, and means controlled by the reciprocation of the table for operating the cam.

23. The method of feeding the glass batch to a glass furnace, which consists in spreading the batch in a series of layers arranged radially.

24. The method of feeding the glass batch to a glass furnace, which consists in successively spreading the batch in a series of thin layers arranged side by side, and causing the batch to float forwardly in the furnace.

25. The method of feeding the glass batch to a glass furnace, which consists in spreading the batch in a series of layers arranged radially, and causing the batch to float forwardly in the furnace.

26. The method of feeding the glass batch to a glass furnace, which consists in spreading a thin layer of the batch on the molten glass, causing the layer to float bodily forward in the furnace, thereafter spreading a second layer of the batch to one side of the area first covered, and then causing the second layer to float bodily forward in the furnace.

27. The method of feeding the glass batch to a glass furnace, which consists in spreading the batch in a series of thin layers radially arranged, and causing each layer to be individually floated bodily forward in the furnace.

ROBERT GOOD.